(No Model.)
R. TATTERSHALL.
WINDMILL.
No. 248,529. Patented Oct. 18, 1881.
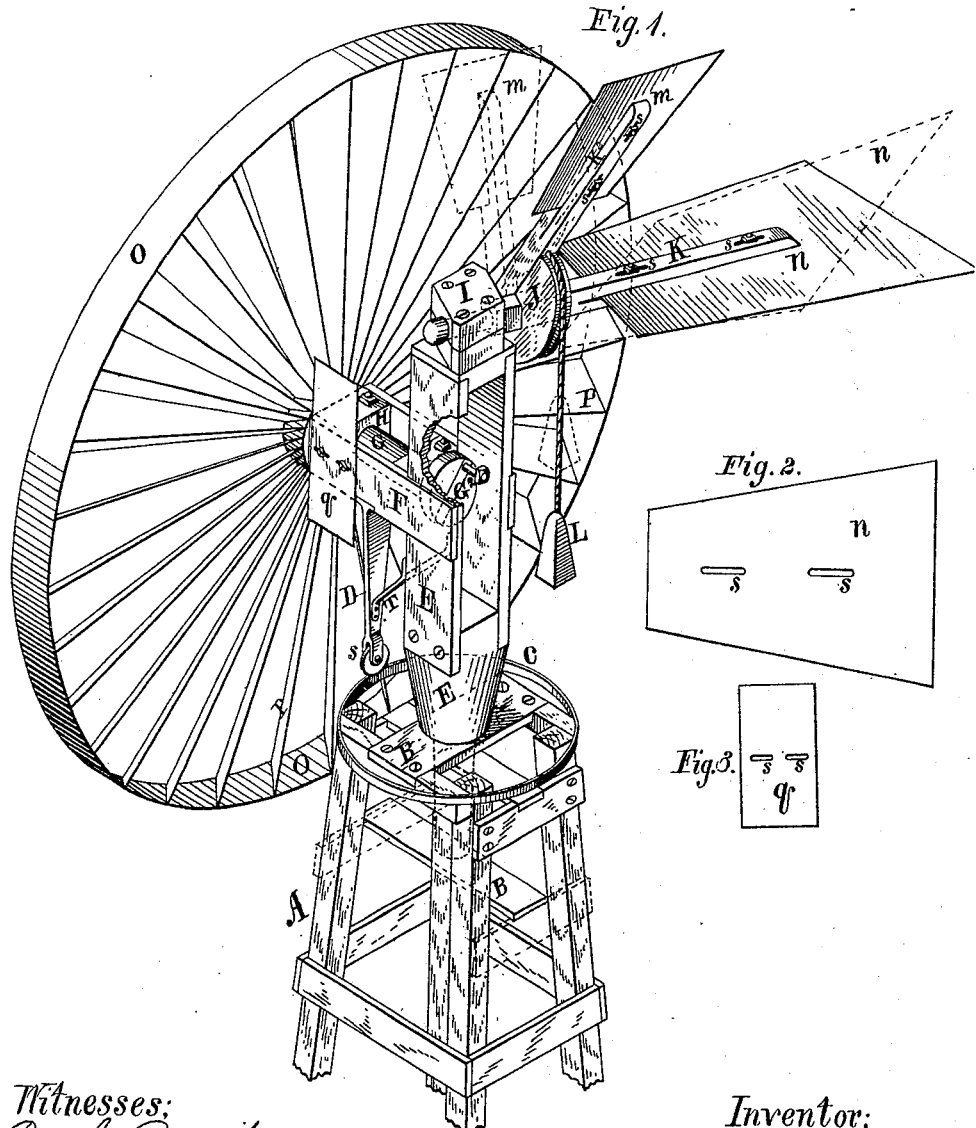
Witnesses:
Paul Broder.
C. O. Tattershall
Inventor:
Richard Tattershall.

UNITED STATES PATENT OFFICE.

RICHARD TATTERSHALL, OF BELOIT, WISCONSIN.

WINDMILL.

SPECIFICATION forming part of Letters Patent No. 248,529, dated October 18, 1881.

Application filed June 6, 1881. (No model.)

*To all whom it may concern:*

Be it known that I, RICHARD TATTERSHALL, a citizen of the United States, residing at the city of Beloit, in the county of Rock and State of Wisconsin, have invented certain new and useful Improvements in Windmills, of which the following is a specification.

My invention relates to improvements in windmills in which the wind-wheel, with the entire appurtenant mechanism, is mounted upon a revolving vertical axis, which itself is mounted upon the top of an ordinary windmill-tower provided with a circular turn-table, as shown, and suitably fitted and adjusted for rotating vertically thereon, and in which the wind-wheel is connected to the vertical axis by means of a suitable horizontal revolving shaft or axis carrying the wheel, whereby its rear surface is always held in direct line with the wind-current, and thus entirely dispensing with the ordinary tail-vane governor usually employed in windmills; and the objects of my improvements are to provide a wind-power much less complicated and more simple in construction, less liable to get out of repair, of far greater proportionate strength to resist and sustain sudden and severe storms by reason of what I belive to be a superior and better-adjusted governing device, much greater motive power in proportion to the cost of production and size of the mill as compared with others in use, more durable, and of greater efficiency in proportion to its size and cost of manufacture. I attain, or aim to attain, these objects by the mechanism illustrated in the accompanying drawings, in which—

Figure 1 is a perspective view of the entire windmill in all its parts. Fig. 2 is a plan view of the blades of the regulating side vanes detached; and Fig. 3 is a similar view of the check-vane also detached.

Similar letters refer to similar parts throughout the several views.

A represents the frame of the tower, upon which the wind-wheel, with all appurtenant mechanism, is mounted, as shown.

B B are transverse supports, having central pivotal bearings for the reception and support of the rotating vertical axis E, which is also supported, in respect to vertical strain caused by the weight of the wheel O, horizontal arm F, and other parts of the machine, upon the circular track C by means of the standard D, caster-wheel S, and brace T, and is also supported and relieved from undue side strain or lateral pressure in the direction of the wind operating the wheel by means of the said standard D, caster-wheel S, and brace T, as shown.

The horizontal arm F is provided with suitable boxes or bearings H, to which the revolving-shaft G is fitted by suitable bearings, the hub of the wheel O being suitably fitted to the projecting end of the shaft G.

The wheel O is composed of a galvanized-metal hoop or band, with fans or sails of similar material. The number of such fans or sails in the wheel of a working windmill containing my invention will be of such number and width of wind-surface as experience shall prove to be most advantageous, with reference, also, to the size or diameter of the wheel and amount of motive power required. The best rule for determining the most available sizes of wheel for mills of varying working capacity will also be the amount of power and speed desired in each grade.

The circular turn-table C and caster-wheel S are designed to be also made of galvanized metal, same as the wind-wheel, the purpose of such construction being to prevent sleet, ice, or snow from adhering to the surfaces of these parts, and for the same reason the vanes M, N, and Q are made of like material; but any other suitable material possessing this requisite quality would be equally available, and I therefore do not confine myself to any particular style, quality of material, or method of treatment thereof for the purpose herein mentioned. The diameter and strength of the circular turn-table C will be such as shall be required and most advantageous. The wheel S shall be of such vertical size as found most practicable. Six or eight inches of diameter may be desirable, the inside of the periphery having a suitable flange for bearing against the inner surface of the track C, thus sustaining and preventing undue latteral pressure upon the vertical axis of the mill.

The pitman of the mill (not shown in the drawings) passes vertically through a tubular opening in the lower part of the vertical axis E, and is attached to the wrist-pin, as shown at G², and the mill is governed by the devices hereinafter specified.

The vane N, with appurtenant devices, is mounted upon the top of the vertical axis E by means of the rotating shaft K and box I, as shown, to which shaft K the half-round pulley J and vane M, by its shaft K², are rigidly fixed, as shown. The shaft K is set at about twenty degrees from a right angle with the arm F and square of the vertical axis E, as shown; and when the mill is working under a pressure of wind compatible with safety the vane N will be in an exactly horizontal position, (though perhaps imperfectly represented in the drawings,) when at the same time the vane M will stand at an angle of about twenty degrees incline over the shaft K, and held in that position by means of the weight L acting upon the pulley J, which is the normal condition of the mill when at work; but when the mill encounters a too heavy wind or a sudden squall the vane M will be carried forward in the direction of the representation of said vane M, as represented by the dotted lines, whereby the shaft K will be rotated in the same direction, bringing the flat side of the vane N before the wind with increasing directness until the face of said vane shall be exactly vertical and shall represent a force proportionate to the wind-surface of said vane and the velocity of the wind-current, by means of which the wind-wheel will be caused to rotate upon and with the vertical axis in the same direction to the extent of a full quarter-turn, should the velocity of the wind be sufficiently intense and long enough continued for that purpose, when the check-vane Q will present its vertical surface to the eye of the wind, thus preventing the wheel from making more than a quarter-turn in case of sudden violent gusts.

It will be understood that as soon as the wheel commences to rotate on its vertical axis out of a direct line to the wind-current its danger of accident therefrom diminishes proportionately until a quarter-turn shall have been made, when the edge of the wheel will be presented to the eye of the wind—a position of freedom from danger to the mill—and is the only one in which it will cease working, save in a calm; and it will be equally well understood that in exact ratio to the relaxation of the velocity of the wind the weight L will exert sufficient force on the pulley J to rotate the shaft K and restore the wind-wheel and governing device to their normal position, as hereinbefore described and shown.

It will also be observed that the blades of all of the three vanes are adjustable by means of the slots s in each, as shown, whereby said vanes may be extended or taken in, by means of which the mill may be adjusted to a greater or less wind-pressure, as desired, and said vanes will be of such size as found most practicable; and the length of the shaft G from the center of the vertical axis E will determine the facility with which the wheel may be governed by means of the vanes M N and weight L, as shown and described.

It will further be observed that the fans P also constitute the spokes of the wheel, though other spokes may be employed if necessary or preferred, and for greater strength and safety the shaft G may be extended in front of the wheel (reduced in size) far enough to admit of suitable braces being set at about forty-five degrees from the front of the extended hub of the shaft G to a proper number of the fans or spokes about midway of their length, so as to impart necessary strength to the wheel.

The mill here represented and shown is constructed chiefly of wood as a working experiment to test its practical value, so far as attainable by a mill of such construction; but it is expected that the whole may be, at least, as cheaply constructed of metal, thereby obtaining far greater strength and durability without materially increasing the weight of the mill. The shaft K, carrying the vanes M N and pulley J, is set at the angle hereinbefore specified to enable it to attain a position whereby, in case of a sudden squall, the vane N may receive the full force of the wind upon the front side of its vertical wind-surface before acting upon the mill, and will continue to present its said vertical surface to the wind at the same angle when the mill shall have made a quarter-turn, the wheel then presenting its edge or periphery to the wind, as hereinbefore described, when the vane M will be in the position represented by the dotted lines. Now, the vertical axis E may be extended high enough so that the regulating device could not obstruct any part of the wind from reaching any part of the wheel in full force, or the wheel might be sufficiently elevated on the vertical axis to allow the regulating mechanism to be applied near the foot of the vertical axis and below the lower periphery of the wheel.

One of the cardinal features in the construction and regulation of a windmill is to enable the wheel to get out of the way of sudden squalls or continued heavy storms, and which must be accomplished very surely and quickly for the safety of the mill, which great desideratum, it is believed, has been achieved and secured by my invention.

I am aware that prior to my invention windmills have been made so that the wheel acted as its own vane, thereby dispensing with the ordinary tail-vane. I therefore do not claim such construction, broadly; but What I do claim as my invention, and desire to secure by Letters Patent, is—

1. In a windmill, a wheel made and consisting of the hoop or band O, and fans or sails P, rigidly connected to the hoop O and hub of the wheel, dispensing with ordinary spokes, and mounted upon the vertical axis E by means of the arm F and shaft G, and also supported vertically and laterally upon the turn-table C by standard D, brace T, and caster-wheel S, the whole being mounted upon the tower A, substantially as specified and shown.

2. The rotating shafts K and K², carrying the extensible vanes M and N, pulley J, and weight L, mounted upon the vertical axis E by means of the bearing or box I, substantially as described and shown.

3. The extensible check-valve $q$, in combination with the rotating shafts K and K², carrying the extensible vanes M and N, pulley J, and weight L, mounted upon the vertical axis E by means of the bearing or box I, substantially as set forth and shown.

RICHARD TATTERSHALL.

Witnesses:
PAUL BRODER,
C. O. TATTERSHALL.